May 6, 1930.  C. F. WRAY  1,757,823
CHECK VALVE CONSTRUCTION
Filed May 21, 1927
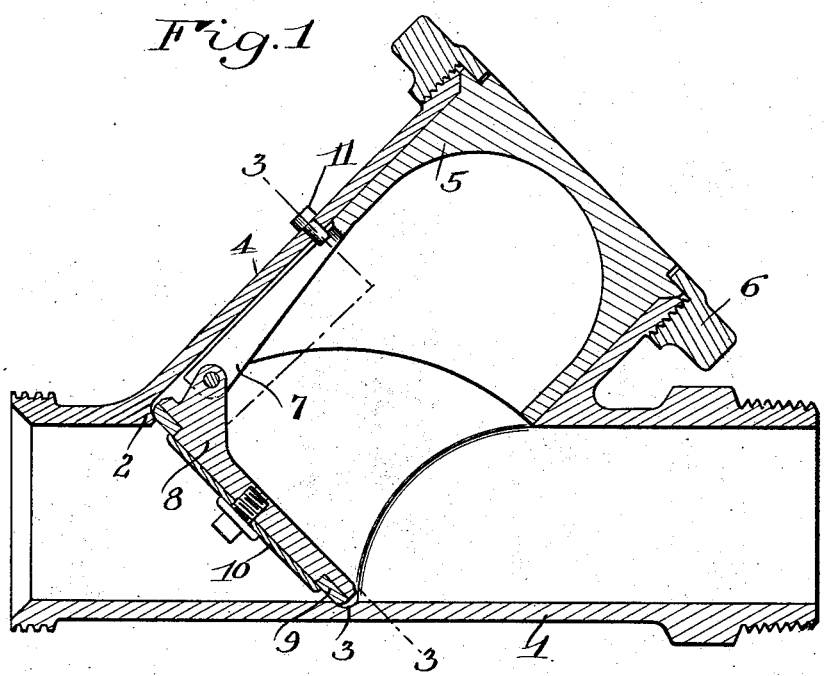
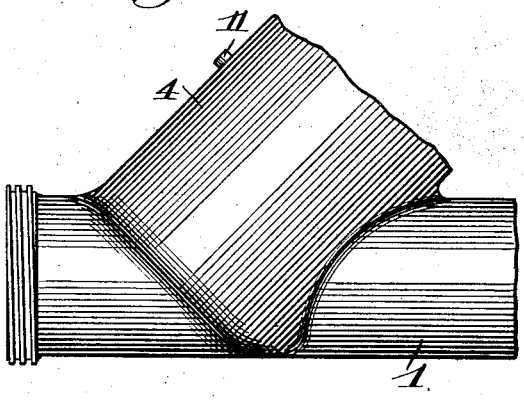
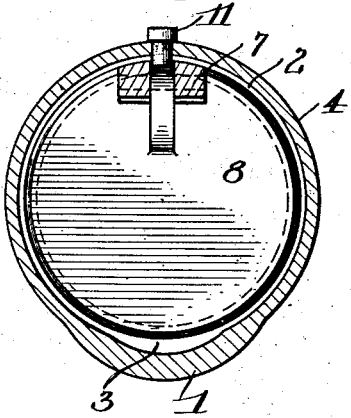
INVENTOR
Charles F. Wray
BY
Harold E. Struebraker
his ATTORNEY Patented May 6, 1930

1,757,823

UNITED STATES PATENT OFFICE

CHARLES F. WRAY, OF ROCHESTER, NEW YORK, ASSIGNOR TO NATIONAL BRASS MANUFACTURING COMPANY, OF ROCHESTER, NEW YORK, A CORPORATION OF NEW YORK

CHECK-VALVE CONSTRUCTION

Application filed May 21, 1927. Serial No. 193,290.

This invention relates to a check valve construction, being more particularly adapted for controlling flow of milk from a pump to a pasteurizer, and it has for its object to afford a structure including few parts of simple construction, which can be manufactured practically and economically, and is thoroughly sanitary.

A more particular purpose of the invention is to afford a positive and quick acting check valve, the parts of which can be easily removed at frequent intervals and readily cleaned to permit complete sterilization of the entire unit.

To these and other ends, the invention consists in the construction and arrangement of parts that will appear from the following description, when read in conjunction with the accompanying drawing, the novel features being pointed out in the claims following the description.

In the drawing:

Figure 1 is a sectional view of a check valve construction incorporating a preferred embodiment of the invention;

Figure 2 is a side elevation, and

Figure 3 is a sectional view on the line 3—3 of Figure 1.

Referring more particularly to the drawing in which like reference numerals refer to the same parts throughout the several views, 1 designates a pipe section which may be suitably connected in a conduit leading to a milk pasteurizing vat, and 2 is a valve seat formed integrally with the pipe section and disposed at an acute angle to its longitudinal axis, the lowermost part of the seat being formed by providing a recess or pocket 3 in the bottom surface of the opening in the pipe section.

4 is a valve housing formed integrally with the pipe section and disposed perpendicularly to the valve seat aforementioned, while 5 is a valve support preferably cylindrical in form and of hollow construction, while the outer end of the support is closed to afford a closure for the valve housing when the parts are in operative relationship. 6 is a nut threaded on the housing 4 and engaging the outer end of the support 5 to hold the latter in place.

The valve support 5 is of greater length on one side than on the other to conform generally to the contour of the angular valve housing, and on its inner side, the support has a yoke 7 within which is pivoted the valve 8. Valve 8 has a seat portion 9 of block tin or other suitable material held on by the plate 10 and arranged to engage the valve seat already described. When the parts are properly positioned, the valve support is so located as to cause the valve to swing about an axis above the top of the pipe section as shown in Figure 1, while on the opposite side, the valve support terminates at a point substantially flush with the top of the opening in the pipe section.

To insure such proper positioning of the valve support as it is inserted into the housing, the latter is provided with a pin or projection 11 arranged to engage between the opposite arms of the yoke 7, or in a slot in the valve support, and thus hold the valve support in a predetermined relationship. When it is desired to clean the parts, the nut 6 is removed, and likewise the valve support 5 which carries with it the valve 8. This entire unit can be thoroughly sterilized and the inside of the pipe section and housing can be easily cleansed by passing a swab through the respective openings.

While the invention has been described with reference to a particular construction and definite purpose, it is not confined to the details or arrangements herein shown and described, and this application is intended to cover any modifications or departures coming within the purposes of the improvement or the scope of the following claims.

I claim:

1. The combination with a pipe section having a valve seat formed integrally therewith and arranged transversely at an acute angle to its longitudinal axis, the bottom surface of the opening in the pipe section being formed to constitute a portion of said seat, a valve housing formed integral with the pipe section, a removable cylindrical support arranged in the housing, a check valve pivoted to said support so as to swing about an axis above the pipe section, and cooperating means on the housing and support to guide and position the latter as it is inserted into the housing.

2. The combination with a pipe section having a valve seat formed integrally therewith and arranged transversely at an acute angle to its longitudinal axis, a valve housing formed integrally with the pipe section and arranged perpendicularly to said seat, a removable cylindrical valve support positionable in the housing and closed at its outer end, means for holding the support in the housing, cooperating means on the housing and support for guiding and positioning the latter as it is inserted into the housing, and a valve pivoted to the support so as to swing about an axis above the pipe section.

3. The combination with a pipe section having a valve seat arranged transversely at an acute angle to its longitudinal axis, and a valve housing formed integral with the pipe section, of a removable cylindrical support positionable within the housing and having a closed outer end, a collar threaded on the housing and engaging the cylindrical support for holding it in place, positioning means for locating the support relatively to the housing as it is inserted therein, and a check valve pivoted to the support.

4. The combination with a pipe section having a valve seat arranged transversely at an acute angle to its longitudinal axis, and a valve housing formed integral with the pipe, of a cylindrical support positionable within the housing and including an inwardly extending yoke, a guiding member carried by the housing and engageable between the arms of said yoke to position the support as it is inserted into the housing, and a check valve pivoted between the arms of said yoke at the inner end thereof.

5. The combination with a pipe section having a valve seat arranged transversely at an acute angle to its longitudinal axis, and valve housing formed integral with the pipe, of a cylindrical support positionable within the housing and having a closed outer end, a threaded sleeve attachable to the outer end of the housing and engageable with the support to hold the latter in place, said support having an inwardly extending yoke, a guiding member carried by the housing and engageable between the arms of said yoke to locate the support relatively to the housing as it is inserted, and a check valve pivoted between the arms of said yoke at the inner end thereof.

In witness whereof, I have hereunto signed my name.

CHARLES F. WRAY.